United States Patent [19]

Godard

[11] 4,259,617
[45] Mar. 31, 1981

[54] DEVICE FOR PRODUCING AN ELECTRIC DISCHARGE IN A FLAT-PLATE TRANSMISSION LINE

[75] Inventor: Bruno Godard, Gif-sur-Yvette, France

[73] Assignee: Societe Anonyme dite: Compagnie Generale d'Electricite, Paris, France

[21] Appl. No.: 46,129

[22] Filed: Jun. 6, 1979

[30] Foreign Application Priority Data

Jun. 9, 1978 [FR] France .............................. 78 17270

[51] Int. Cl.³ .............................................. H01S 3/09
[52] U.S. Cl. ................................... 315/326; 315/111; 315/334; 331/94.5 PE
[58] Field of Search ................. 331/94.5 PE; 330/4.3; 315/111, 241 R, 326, 334

[56] References Cited

U.S. PATENT DOCUMENTS

| | | | |
|---|---|---|---|
| 3,821,664 | 6/1974 | Godard et al. | 331/94.5 PE |
| 4,178,563 | 12/1979 | Huet et al. | 331/94.5 PE |

*Primary Examiner*—Eugene R. LaRoche
*Attorney, Agent, or Firm*—Sughrue, Rothwell, Mion, Zinn and Macpeak

[57] ABSTRACT

A device for producing an electric discharge in a flat-plate transmission line.

The device includes at least a first electrode (8), a second electrode (9) opposite the first electrode and passing through a hole (5) in the transmission line (1). With this arrangement it is possible to avoid deposits of metal particles building up on the edges of the hole and eventually shorting together opposite sides of the transmission line.

Such flat-plate transmission lines are used in particular in nitrogen laser generators.

13 Claims, 4 Drawing Figures

DEVICE FOR PRODUCING AN ELECTRIC DISCHARGE IN A FLAT-PLATE TRANSMISSION LINE

The present invention relates to a device for setting up an electric discharge in a flat plate transmission line, and more particularly to a device for setting up an electric discharge in a flat-plate transmission line with a view to exciting a gas laser generator.

BACKGROUND OF THE INVENTION

It is known that a flat-plate transmission line mainly includes an insulating plate interposed between two metal sheets brought to different electric potentials. It is known to set up an electric discharge in a line of this type by means of a device which includes two opposed electrodes situated respectively on either side of the line and connected respectively to the two metal sheets of the flat-plate transmission line. These electrodes are generally aligned along an axis perpendicular to the plane of the flat-plate transmission line, the axis passing through a transversal opening in the transmission line. The device is provided with a system which is capable of triggering an electric discharge between the two electrodes. The discharge causes a current wave to be formed which propagates in the transmission line. The current wave excites the active material of a gas laser said gas laser; being disposed, for example, in a slot in one of the metal sheets of the transmission line.

After a few discharges, the operation of the device described above becomes unsatisfactory, since short-circuits appear between the metal sheets across the opening. These short-circuits are built up from metal deposits released by the electric discharges. To try to mitigate this disadvantage, circular surfaces have been disposed around the opening in the insulating plate. These surfaces are not covered by the metal sheets. The proper operation life of the device is thereby lengthened, but after some time, the metal deposits which occur also on these annular surfaces manage to form a conductive film which short-circuits the two metal sheets.

Preferred embodiments of the present invention remedy this disadvantage by producing a spark gap for a flat-plate transmission line which spark gap is capable of operating without incident during numerous successive discharges.

SUMMARY OF THE INVENTION

The present invention provides a device for setting up an electric discharge in a flat-plate transmission line, said device having a transversal opening, the flat-plate transmission line including an insulating plate, a first metal sheet pressed against a first surface of the plate and a second metal sheet pressed against a second surface of the plate, the device including:
at least one first electrode;
a second electrode opposite to said first electrode, the second electrode being disposed along an axis which passes through the opening perpendicular to the plane of the plate;
a first metal part disposed on a first side of the transmission line, the metal part being in contact with the first electrode and pressing on a first portion of a first metal sheet, said portion surrounding the opening;
a second metal part disposed on the second side of the transmission line, the second part being in contact with the second electrode and pressing on a second portion of a second metal sheet, said portion surrounding the opening, the first and second metal parts forming a portion of the walls of a chamber which immediately surrounds the opening and the space between the first and second electrodes;
a high voltage electric cell whose terminals are connected respectively to the first metal sheet and to the second metal sheet so as to charge the electrodes; and
means for triggering an electric discharge between the first electrode and the second electrode. The improvement involves
the second electrode in contact with the second metal part passing through the opening from the second side towards the first side of the transmission line through the entire thickness thereof so that the end of the second electrode and the opposite end of the first electrode are situated in the chamber beyond the first metal sheet.

According to a preferred embodiment, the device includes:
n first electrodes in electric contact with the first metal part and opposite to the second electrode, n being an integer at least equal to 2; and
means are then provided for triggering simultaneous electric discharges between the n first electrodes and the second electrode which advantageously has n plane surface respectively opposite to the ends of the n first electrodes.

Whether there are one or n first electrodes, each first electrode is constituted by the threaded metal cap of a spark plug fitted with an axial metal rod which is connected mechanically to the cap by an insulator, each spark plug being screwed into the first metal part and being associated with an electric circuit which is able to trigger an electric discharge between said metal rod and said cap.

In accordance with a particularly advantageous embodiment, the position of each first electrode and the position of the second electrode can be modified respectively in the first and second metal parts so as to allow the inter-electrode distance to be set.

BRIEF DESCRIPTION OF THE DRAWINGS

Particular embodiments of the present invention are described hereinbelow by way of example, with reference to the accompanying drawings, in which.

DESCRIPTION OF PREFERRED EMBODIMENTS

Figure 1:
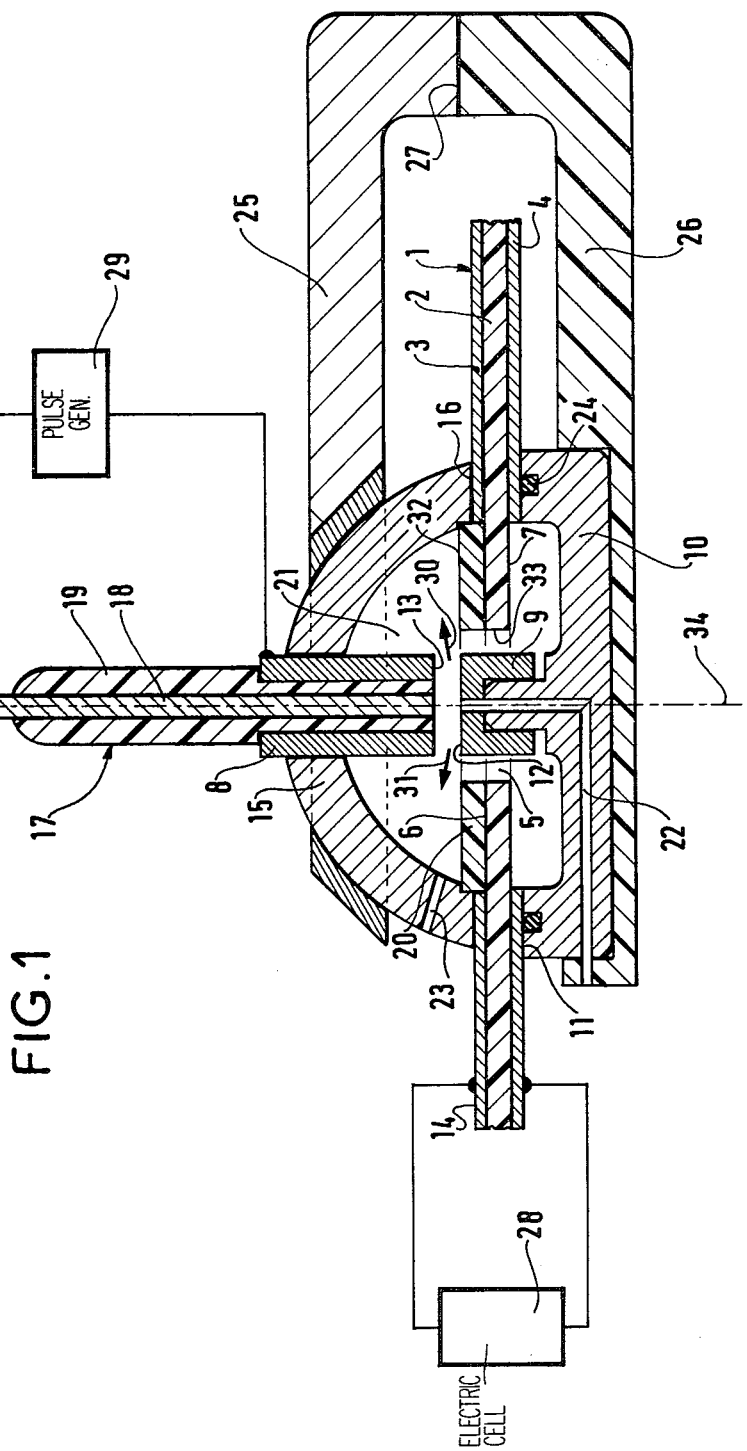
FIG. 1 is a cross-section of a first embodiment including a first electrode.

FIG. 1 illustrates partially a flat-plate transmission line 1 which includes an insulating plate 2 on whose surfaces two metal sheets 3 and 4 are respectively applied. The transmission line 1 has a transversal opening 5 which has, for example, a circular cross-section. Each surface of the plate 2 has an annular surface which immediately surrounds the opening 5 and is not covered by the corresponding metal sheet. Therefore, the figure shows that the annular surface 6 is not covered by the sheet 3 and that the annular surface 7 is not covered by the sheet 4, the annular surfaces 6 and 7 on opposite sides of the mid plane of the plate 2.

Two opposite electrodes 8 and 9 are disposed along an axis 34 which is perpendicular to the plane of the plate 2 and which passes through the centre of the opening 5.

The electrode 9 is fixed on a metal part 10 which presses against a portion 11 of the metal sheet 4. The portion 11 can be, for example, annular and immediately surrounds the annular surface 7 which is not covered by the sheet 4. Preferably, the electrode 9 is detachably fixed on the part 10. It can be fixed by screwing onto the part 10, as illustrated.

In accordance with one disposition of the invention, the electrode 9 in contact with the part 10 passes through the opening 5 throughout the whole thickness of the flatplate transmission line 1, from the metal sheet 4 to the metal sheet 3, so that the end surface 12 of the electrode 9 is situated beyond the outer surface 14 of the metal sheet 3 said end surface 12 being opposite the end surface 13 of the electrode 8.

The electrode 8 is detachably fixed on a metal part 15 which presses on a portion 16 e.g. an annular portion of the metal sheet 3. The annular portion 16 immediately surrounds the annular surface 6 which is not covered by the metal sheet 3. Preferentially, the electrode 8 is fixed on the part 15 so as to allow longitudinal movement of the electrode 8 with respect to the part 16 along the axis 34.

The electrode 8 is constituted by the tubular metal cap of a spark plug for an internal combustion engine. In this case, the spark plug 17 is screwed into the previously tapped part 15 so as to co-operate mechanically with the outer thread of the cap of the spark plug 17 which is of a type which includes: an axial metal rod 18 which extends up to the end surface 13 of the electrode inside the cap 8; and an insulator 19 which surrounds the rod 18 along part of the length of its cylindrical surface. The insulator fills the space between the outer cylindrical surface of the rod 18 and the inner cylindrical surface of the cap 8.

An insulating washer 20, made, for example of polytetrafluoroethylene, can be disposed on the plate 2 so as to cover completely the annular surface 6.

As illustrated in FIG. 1, the metal parts 10 and 15 which press respectively on the metal sheets 4 and 3 advantageously form a chamber 21 which surrounds the opening 5 and the space between the end surfaces 12 and 13 of the electrodes 9 and 8.

The metal parts 10 and 15 can include internal passages which allow a gas to flow inside the chamber 21. The figure thus illustrates a passage 22 which passes through the thickness of the part 10 and of the electrode 9, allowing a gas to enter the chamber 21 through the axial portion of the electrode 9. A passage 23 is provided in the part 15 to allow the gas to leave the chamber 21.

The chamber 21 is made gas-tight to the circulating gases by means of O rings such as 24 recessed in grooves of the metal parts and pressing on the annular portions of the metal sheets.

The metal parts 10 and 15 are pressed against the flat-plate transmission line by a support which can comprise a metal part 25 fixed on the part 15 and an insulating part 26 fixed on the part 10. The parts 25 and 26 are held against each other on a common surface 27 by mechanical connection means, not shown.

The two terminals of a high-voltage electric cell 28 are connected respectively to the two metal sheets 3 and 4 of the flat-plate transmission line 1.

The two output terminals of an electric pulse generator 29 are connected respectively to the electrode 8 and to the rod 18 of the spark plug 17.

The device illustrated in FIG. 1 operates as follow:

Firstly, the distance between the electrodes is adjusted by screwing the cap 8 of the spark plug 17 in the tapped hole provided in the part 15. The outer orifice of the passage 22 is then connected to a gas source, for example a cylinder of compressed air and an adjustable valve is disposed at the outlet of the passage 23 so that the pressure of the air which circulates inside the chamber 21 is set at the required value.

The electrodes 8 and 9 are charged at the potential difference of the electric cell 28, since the electrode 8 is connected to a terminal of the electric cell by the part 15 and to the sheet 3, and since the electrode 9 is connected to the other terminal of the electric cell 28 by the part 10 and the sheet 4. Of course, the distance between the electrodes is adjusted to a sufficient value to prevent any discharge between the electrodes.

An electric pulse generator 29 is then made to send a pulse which modifies the state of ionization of the gas situated near the end surface 13 of the electrode 8 and consequently trigges an electric discharge between the electrodes 8 and 9. The rod 18 of the spark plug 17 therefore performs the function of an auxiliary electrode.

At each electric discharge, metal dust is torn away from the electrodes. The dust is thrown out violently into the space between the electrodes, substantially in the direction of the arrows 30 and 31. The metal dust is therefore deposited on the inner wall of the metal part 15 or on the plane outer surface 32 of the washer 20. No triggering between the metal sheets can result therefrom since no metal deposit can be formed on the edge surface 33 of the opening 5 and a fortiori on the annular surface 7 of the plate 2.

Disposing the washer 20 on the annular surface 6 has the advantage of facilitating the replacing or even the cleaning of the washer, since the metal dust does not adhere very well to polytetrafluoroethylene. But even in the case where the washer is not disposed on the surface 6, there is no danger of electric triggering between the two metal sheets.

Figure 2:
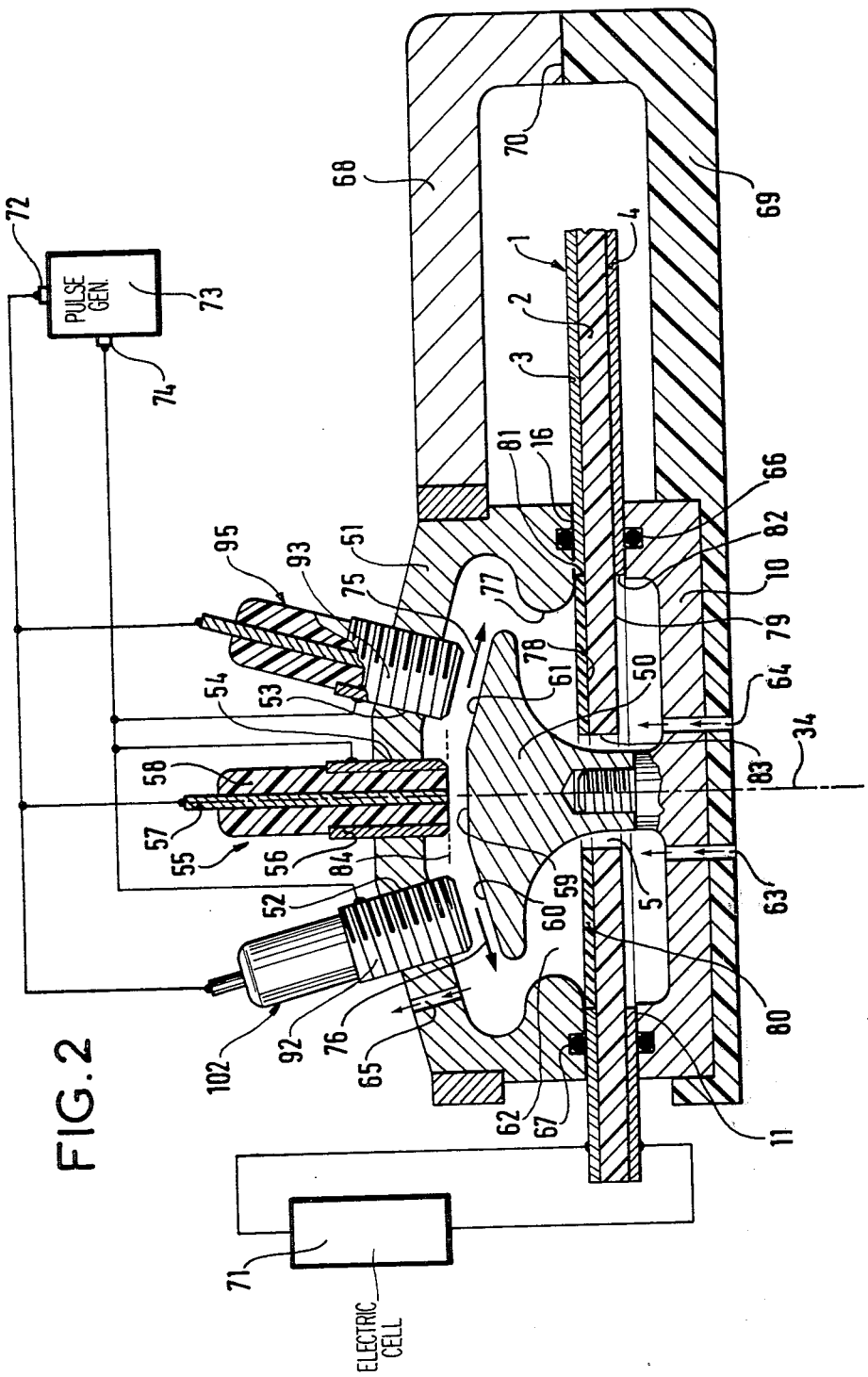
FIG. 2 is a cross-section of a second embodiment including seven first electrodes.

This result is obtained due to the disposition in accordance with the invention of the electrodes 8 and 9 with respect to the flat-plate transmission line, in which the space between the electrodes is situated on the same side as the line 1, i.e. as illustrated in FIG. 2, above the plane of the outer surface 14 of the metal sheet 3.

Further, the device illustrated in FIG. 1 has detachable electrodes which can advantageously be replaced easily after wear. The electrodes are made of a special metal which withstands electric discharges. In contrast, the metal parts 10 and 15 can be made of ordinary electrically conductive metal which is consequently relatively cheap.

The distance between the electrodes can be set very easily by screwing the electrode 8. This allows the power of the electric discharge to be set.

Lastly, the use of a spark plug whose cap constitutes the movable electrode 8 advantageously provides a compact and not very expensive part which includes simultaneously a main electrode and an auxiliary electrode necessary for triggering the discharge, this compact part being in any case specially designed to withstand repeated electric discharges.

Figure 3:
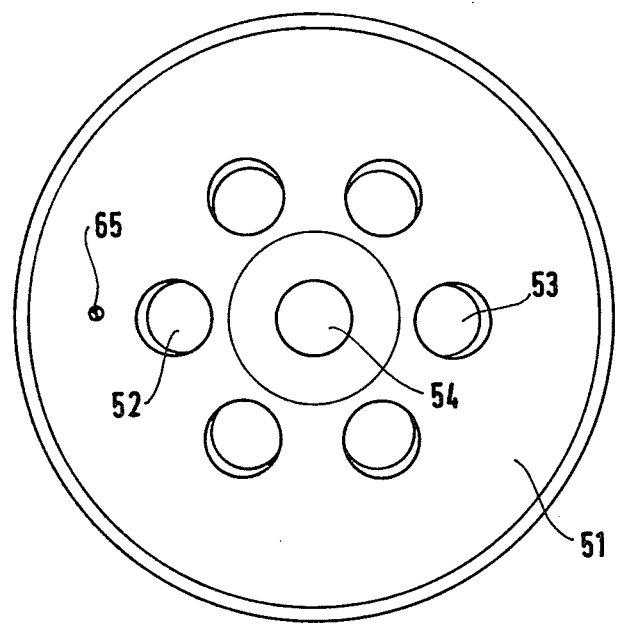
FIG. 3 is a plan of a part of the device illustrated in FIG. 2.

FIGS. 2 and 3 illustrate a variant which allows the power of the electric discharge in the flat-plate transmission line to be increased; in these figures, the reference numerals of the components are the same as those in FIG. 1 when the components are identical.

Thus, FIG. 2 illustrates a flat-plate transmission line 1 disposed horizontally and comprising an insulating plate 2, a metal sheet 3 applied against the upper surface of the plate and a metal sheet 4 applied to the lower surface of the plate. A transversal opening 5 whose cross-section is circular, for example, is arranged on the flat-plate transmission line.

A metal part 10 which presses against a portion 11 of the sheet 4 is disposed above the transmission line 1. The portion 11 surrounds the opening 5 and can be annular in shape. An electrode 50 centered on an axis 34 perpendicular to the plane of the transmission line and passing through the centre of the opening 5 is fixed by screwing onto the central portion of the part 10. The electrode 50 passes through the opening 5 near the upper side of the transmission line through the entire thickness thereof, so that the end of the electrode 50 is situated beyond the metal sheet 3.

Another metal part 51 is disposed above the transmission line and presses on a portion 16 of the sheet 3. The portion 16 surrounds the opening 5 and can be on the opposite side to the portion 11 as illustrated. The part 51, a plan of which can be seen in FIG. 3, includes seven tapped holes such as 52, 53 and 54, the latter tapped hole 54 being centred on the axis 34. The six other holes are spaced out in a ring around the hole 54, at equal distances from one another.

Figure 4:
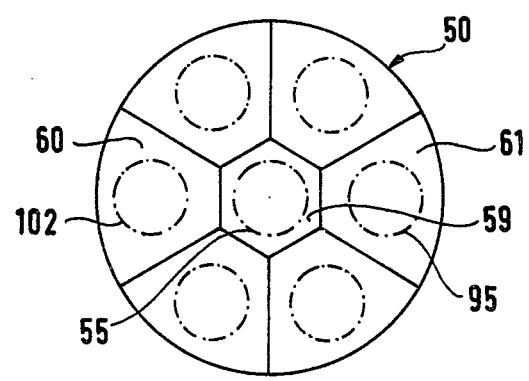
FIG. 4 is a plan view of the second electrode of the embodiment of FIG. 2.

An electrode which can be of the spark plug type is fixed in each of the seven holes. For example, the spark plug 55, fixed in the central opening 54, has a threaded metal cap 56 screwed into the tapped hole 54, an axial metal rod 57 and an insulator 58 which mechanically connects the cap 56 to the rod 57. Two other spark plugs 95 and 102 are also illustrated. Their caps 93 and 92 are screwed respectively into the holes 53 and 52. Preferably, the spark plugs are of the same type as that illustrated in FIG. 1. The opposite ends of the rod 57 and of the cap 56 to the electrode 50 are situated substantially in the same end plane 84, the insulator 58 also extending up to the plane 84 so as to fill all space between the rod 57 and the cap 56. The six peripheral spark plugs which surround the central spark plug 55 are disposed in the part 51 so that their axes form the same predetermined angle α with the axis 34. The angle is preferably fairly small, i.e. about ten degrees. The seven spark plugs, disposed preferably at a short distance from one another, are on the opposite side to the electrode 50 whose end comprises a plane central surface 59 and peripheral surfaces such as 60 and 61 which are substantially plane and parallel to perspective end surfaces of the peripheral spark plugs. Reference to FIG. 4 shows a plan view of the electrode 50 having a hexagonal plane central surface 59 and six plane peripheral surfaces such as 60 and 61, respectively, opposite to the ends of the spark plugs 55, 102 and 95, whose positioning relative to those six plane peripheral surfaces is indicated in dotted line fashion.

Preferably, the upper surface of the insulating plate 2 has an annular portion 78 which is not covered by the metal sheet 3. The annular surface 78 is disposed between the opening 5 and the portion 16 of the sheet 3.

Another annular surface 79 which is not covered by the sheet 4 and on the opposite side to the surface 78 can be provided on the lower surface of the plate 2.

An insulating washer 80 made of polytetrafluoroethylene, for example, can be disposed on the surface 78 so as to cover it completely. Advantageously, the metal parts 10 and 51 form a chamber 62 which surrounds the opening 5 and the space between the electrode 50 and the seven spark plugs. Due to passages such as 63, 64 and 65 which pass through the walls of the chamber 62, it is possible to circulate a gas inside the chamber which is made gas-tight by O rings such as 66 and 67 recessed in grooves in the parts 10 and 51 and pressing against the portions 11 and 16.

The metal parts 10 and 51 press against the transmission line by a support which can comprise a metal portion 68 fixed on the part 51 and an insulating portion 69 fixed on the part 10. The parts 68 and 69 are applied against each other on a common surface 70 by screws which are not illustrated in the figure.

The two terminals of high-voltage electric cell 71 are connected respectively to the two metal sheets 3 and 4 of the transmission line 1.

An output terminal 72 of an electric pulse generator is connected to the metal rods such as 57 of the seven spark plugs and the other output terminal 74 of the electric pulse generator is connected to the caps such as 56 of the seven spark plugs.

The device illustrated in FIG. 2 operates as follows.

Firstly, the axial position of each spark plug is set by screwing or unscrewing its cap in the corresponding tapped hole formed in the part 51, so that the distances which separate the end of each spark plug from the opposite plane surface of the electrode 50 are exactly equal to one another. Then, the outer orificies of the passages 63 and 64 are connected to a gas source, for example to a compressed air cylinder and an adjustable valve is disposed at the output of the passage 65 so that the air pressure circulating in the chamber 62 is set to the required value.

The caps of the seven spark plugs which are electrically connected to the part 51 and to the sheet 3 are brought to a voltage which is equal to the output voltage of the electric cell 71, with respect to the electrode 50 which is connected to the sheet 4 by the part 10. Of course, the distance between the electrode 50 and the ends of the spark plugs has been set to a sufficient value to prevent any discharge between the electrode 50 and the seven spark plugs in these conditions.

The electric cell 73 is then made to emit an electric pulse which causes sparks simultaneously at the ends of the seven spark plugs and causes ionization of the gas in the chamber 62 in the vicinity of the end surfaces of the spark plugs.

Consequently, there results seven simultaneous electric discharges between the caps of the seven spark plugs and the electrode 50. In practice, the absolute simultaneity of the sparks which appear at the ends of the seven spark plugs can be difficult to obtain in some cases. But the special type of spark plug used gives out a spark which is transversal with respect to the axis of the spark plug, since the spark is set up on the outside of the spark plug, along the insulator; the transversal spark plug causes ionization in the gas in the chamber. The ionization propagates from one spark plug to the other much more easily than the ionization caused by the axial spark delivered by conventional type spark plugs used in internal combustion engines. It is known that in such conventional spark plugs, the spark occurs between an axial extension of the cap and the end of the metal rod. Further, the proximity and the mutual disposition of the seven spark plugs described hereinabove also promotes rapid ionization of the gas in the chamber, from one spark plug to another. The result of this is that even if the seven sparks delivered by the seven spark plugs do not occur exactly at the same time, the seven discharges between the caps of the spark plugs and the electrode 50 are absolutely simultaneous. In practice, these seven discharges behave like a single high-power discharge.

The single discharge liberates metal dust which comes from the electrode 50 and the caps of the seven spark plugs. The dust is violently projected out of the space between the electrode 50 and the seven spark plugs, substantially in the direction of the arrows 75 and 76. It is seen that the dust is deposited on the inner wall of the metal part 51. Baffle plates such as protrusions 77 are disposed on the inner wall near the transmission line to avoid deposits of metal dust thereon.

In any case, the metal dust which could be deposited on the flat-plate transmission line would be received on the washer 80 which can easily be cleaned or replaced. The device in accordance with the invention makes it possible to prevent electric priming which could be caused by deposits of metal dust. Indeed, no deposit of metal dust can occur on the annular surface 79 and on the end surface 83 of the plate 2 situated on the edge of the opening 5.

The device in accordance with the invention can be applied to setting up a very high power travelling current wave in a flat-plate transmission line of a nitrogen or rare gas halide laser generator.

Of course, the present invention is in no way limited to the embodiments described and illustrated which have been given only by way of examples. Thus, there can be any number of electrodes fixed on the metal part 51. Further, some means of the device can be replaced by equivalent means.

I claim:

1. A device for setting up an electric discharge in a flat-plate transmission line, said flat-plate transmission line including an insulating plate, a transversal opening within said insulation plate, a first metal sheet pressed against a first surface of said plate and a second metal sheet pressed against a second surface of said plate, said device including:
    at least one first electrode;
    a second electrode opposite to said first electrode, said second electrode being disposed along an axis which passes through the opening perpendicularly to the plane of said plate;
    a first metal part disposed on a first side of said transmission line, said first metal part being in contact with said first electrode and pressing on a first portion of said first metal sheet, said portion surrounding the opening;
    a second metal part disposed on the second side of said transmission line, said second metal part being in contact with said second electrode and pressing on a second portion of said second metal sheet, said portion surrounding the opening, said first and second metal parts forming a portion of the walls of a chamber which immediately surrounds the opening and the space between said first and second electrodes;
    a high-voltage electric cell whose terminals are connected respectively to said first metal sheet and to said second metal sheet so as to charge the electrodes; and
    means for triggering an electric discharge between said first electrode and said second electrode;
    the improvement wherein said second electrode in contact with said second metal part passes through the opening from the second side towards the first side of the transmission line through the entire thickness thereof so that the end of said second electrode and the opposed end of said first electrode are situated in the chamber beyond the first metal sheet.

2. A device according to claim 1, wherein said at least one first electrode comprises;
    n first electrodes in electric contact with the first metal part and opposite to the second electrode, n being an integer at least equal to 2; and said device further comprises
    means for synchronously triggering electric discharges between said n first electrodes and the second electrode.

3. A device according to claim 2, wherein one of said n first electrodes is disposed along the same axis as the second electrode and wherein the other n first electrodes are spaced out regularly in a ring around the axis, their axes forming, with the latter, the same predetermined angle.

4. A device according to claim 3, wherein the end of the second electrode has n plane surfaces opposite to the respective ends of said n first electrodes.

5. A device according to claim 1, wherein said at least one first electrode is detachably fixed to the first metal part and wherein it includes means for longitudinally moving said at least one first electrode with respect to the first metal part, so as to allow the distance between the opposite ends of said at least one first electrode and of said second electrode to be adjustably set.

6. A device according to claim 1, wherein the second electrode is detachably fixed on the second metal part.

7. A device according to claim 1, wherein said at least one first electrode is constituted by the threaded metal cap of a spark plug fitted with an axial metal rod which is connected mechanically to the cap by an insulator, said spark plug being screwed into the first metal part and being operatively connected to an electric circuit for triggering an electric discharge between said metal rod and said cap.

8. A device according to claim 7, wherein the ends of the rod, of the insulator, and of the cap of spark plug, are situated in the same plane so as to cause the forming of a spark which is transversal with respect to the axis of the spark plug.

9. A device according to claim 1, wherein the first surface of the insulating plate has a first annular portion which is not covered by the first metal sheet the first annular portion of the surface being disposed between the opening and the first flat portion and wherein the second surface of the insulating plate has a second annular portion which is not covered by the second metal sheet, the second annular portion of the surface being disposed between the opening and the second flat portion.

10. A device according to claim 9, further including, an insulating washer which covers the first annular portion of the surface.

11. A device according to claim 1, further including means for circulating a gas in said chamber.

12. A device according to claim 1, further including a support for pressing the first and second metal parts respectively on the first and second metal sheets of the flat-plate transmission line.

13. A device according to claim 1, wherein the inner wall of said chamber includes baffle plates to prevent the metal particles torn away from the electrodes during discharges from being deposited on the flat-plate transmission line.

* * * * *